United States Patent [19]

Groh et al.

[11] Patent Number: 5,283,303

[45] Date of Patent: Feb. 1, 1994

[54] TRANSPLANT THERMOPLASTIC MOLDING COMPOUND MADE OF 2,3-DIFLUOROACRYLIC ACID ESTERS

[75] Inventors: Werner Groh, Charlotte, N.C.; Peter Herbrechtsmeier, Königstein/Taunus, Fed. Rep. of Germany; Rudolf Heumüller, Rodgau, Fed. Rep. of Germany; Jürgen Theis, Oberursel, Fed. Rep. of Germany; Gerhard Wieners, Frankfurt am Main, Fed. Rep. of Germany

[73] Assignee: Hoechst Aktiengesellschaft, Frankfurt am Main, Fed. Rep. of Germany

[21] Appl. No.: 941,138

[22] Filed: Nov. 3, 1992

Related U.S. Application Data

[62] Division of Ser. No. 768,905, Dec. 12, 1991, Pat. No. 5,175,790.

[30] Foreign Application Priority Data

Apr. 13, 1989 [DE] Fed. Rep. of Germany ....... 3912151

[51] Int. Cl.$^5$ .............................................. C08F 18/20
[52] U.S. Cl. .................................................... 526/245
[58] Field of Search ......................................... 526/245

[56] References Cited

U.S. PATENT DOCUMENTS

4,863,236  9/1989  Herbrechtsmeier .
5,081,165  1/1992  Inukai et al. .

FOREIGN PATENT DOCUMENTS

| 0209299 | 1/1987 | European Pat. Off. . |
| 56-118408 | 9/1981 | Japan . |
| 58-105102 | 6/1983 | Japan . |
| 59-202208 | 11/1984 | Japan . |
| 60-191447 | 9/1985 | Japan . |
| 61-209 | 1/1986 | Japan . |
| 62-38419 | 2/1987 | Japan . |
| 385502 | 4/1992 | Japan . |
| 60170606 | 4/1992 | Japan . |
| 609156 | 10/1984 | United Kingdom . |

*Primary Examiner*—Joseph L. Schofer
*Assistant Examiner*—N. Sarofim
*Attorney, Agent, or Firm*—Curtis, Morris & Safford

[57] ABSTRACT

A thermoplastic molding compound consisting of units of 2,3-difluoroacrylic acid esters or their deuterated derivatives, or containing units of these esters, is distinguished by a high glass transition temperature and a high transparency. It is therefore suitable for the manufacture of beam waveguides for long transmission distances and high continuous use temperatures.

2 Claims, No Drawings

TRANSPLANT THERMOPLASTIC MOLDING COMPOUND MADE OF 2,3-DIFLUOROACRYLIC ACID ESTERS

This is a division of application Ser. No. 07/768,905, filed Dec. 12, 1991, U.S. Pat. No. 5,175,790.

The invention relates to amorphous polymers which contain units of 2,3-difluoroacrylic acid esters and have a high glass transition temperature and a high transparency.

The copolymerization of methyl 2,3-difluoroacrylate with $\alpha,\beta,\beta$-trifluorostyrene is known (q.v. Tevlina A. S. et al., VINITI 127-81 (1981)). The properties of the copolymers formed were not published.

A transparent molding compound containing monomer groups derived from 2,3-difluoroacrylic acid [lacuna] of fluorinated, chlorinated or brominated polycyclic alcohols has also been disclosed (q.v. DE 3707923). Nothing is known of the properties of these compounds.

Furthermore, an optical material is known which consists of polymeric 2-fluoroacrylic acid esters of, in particular, aliphatic alcohols, it being possible for said esters to contain deuterium atoms both in the alcohol component and in the $\beta$-position of the 2-fluoroacrylic acid component (q.v. EP 128517). These polymers have refractive indices of between 1.45 and 1.60 and glass transition temperatures of between 100° and 200° C. and are used as the core material for optical fibers (beam waveguides).

The preparation and properties of polymers of fluoroalkyl 2-fluoroacrylates are also known (q.v. EP 128516). The polymers are prepared by free radical-initiated bulk, solution or suspension polymerization of the monomers in the presence of a chain transfer agent at a temperature of between 0° and 100° C. They have refractive indices of between 1.36 and 1.44 and softening points of between 80° and 140° C.

These polymers still contain two hydrogen atoms in the acid component and perhaps further hydrogen atoms in the alcohol component, thereby impairing the transparency of the polymers in the visible and near infrared regions of the electromagnetic spectrum.

Moreover, it has already been proposed to use beam waveguides of poly(2- fluoroacrylic acid esters) in the core and either poly(2,3-difluoroacrylic acid esters) or copolymers of TFE, perfluoroalkyl vinyl ethers and $\omega$-alkoxycarbonyl(perfluoroalkyl vinyl ethers) in the sheath of a beam waveguide [sic].

The object of the invention was to provide a polymer which had a high transparency in the wavelength region of visible light and at the same time a high glass transition temperature, and which could be processed to form beam waveguides for long transmission distances and high continuous use temperatures.

The invention relates to a transparent thermoplastic molding compound consisting of 10 to 100% by weight of units derived from one or more esters of formula I:

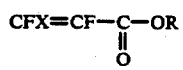
(I)

wherein
X is a hydrogen atom or a deuterium atom and
R is a linear, branched or cyclic $C_1$–$C_{10}$ alkyl group or a $C_6$–$C_{10}$ aryl group, it being possible for all or some of the hydrogen atoms in R to be replaced with fluorine, chlorine, bromine or deuterium atoms, and 90 to 0% by weight of units derived from other copolymerizable vinyl compounds.

The invention further relates to the preparation of the molding compounds and to their use for the manufacture of optical objects, especially beam waveguides.

In formula I, X is a hydrogen atom or a deuterium atom and R is a linear, branched or cyclic $C_1$–$C_{10}$ alkyl group or a $C_6$–$C_{10}$ aryl group, preferably a phenyl or benzyl group, it being possible for all or some of the hydrogen atoms in R to be replaced with fluorine, chlorine or bromine atoms.

The acid component of the esters preferably consists of 2,3-difluoroacrylic acid or 3-deutero-2,3-difluoroacrylic acid, especially 3-deutero-2,3-difluoroacrylic acid.

The alcohol component is preferably methanol or a fluorinated or chlorinated linear, branched or alicyclic alcohol or an aromatic alcohol having 2 to 10 carbon atoms. Especially preferred alcohol components are methanol, fluorinated and chlorinated branched or alicyclic alcohols having 3 to 10 carbon atoms, and phenols and benzyl alcohol, in particular methanol, hexafluoroisopropanol and 2-deuterohexafluoroisopropanol, alkyl-substituted and aryl-substituted hexafluoroisopropanols such as perfluoro-2,3-dimethylbutan-2-ol, 2-pentafluorophenylhexafluoroisopropanol and 2-(p-fluorophenyl)hexafluoroisopropanol, fluorinated and chlorinated cyclopentanols and cyclohexanols, and 1,4,5,-6,7,7-hexachloro-and -hexabromo-bicycloheptenol, 1,4,5,-6,7-pentachloro- and 1,4,5,6-tetrachloro-bicycloheptenol, 5,5,6,6-tetrakis(trifluoromethyl)bicycloheptanol, 5,6-difluoro-5,6-bis(trifluoromethyl)bicycloheptanol, 5,5,6,6tetrafluorobicycloheptanol, 1,4,5,5(or 6,6),7,8-hexachloro-6(or 5-)oxobicyclooctenol [sic] or (1,4,5,6,7,7-hexachlorobicycloheptenyl)-methanol and deuterated derivatives thereof, and pentafluoro-, pentachloro- and pentabromophenol.

It is preferred to use esters in whose alcohol or acid component the maximum possible number of hydrogen atoms have been replaced with deuterium, fluorine, chlorine or bromine atoms, especially esters of 2,3-difluoroacrylic acid or 3-deutero-2,3-difluoroacrylic acid with methanol-$d_3$, 2-deuterohexafluoroisopropanol, 3-pentafluorophenylhexafluoroisopropanol, perfluoro-2,3-dimethylbutan-2-ol, perfluoro- or perchloro-cyclopentanol or -cyclohexanol, and 1,4,5,6,7,7-hexachloro- and -hexabromo-bicycloheptenol-$d_3$, 5,6-difluoro-5,6-bis(trifluoromethyl)bicycloheptanol-$d_{11}$, 5,5,6,6-tetrakis(trifluoromethyl)bicycloheptanol-$d_{11}$, 5,5,6,6-tetrafluorobicycloheptanol-$d_{11}$, 1,4,5,5(or6,6),7,8-hexachloro-6(or5-)oxobicyclooctenol-$d_3$ [sic] or (1,4,5,6,7,7-hexachlorobicycloheptenyl)methanol-$d_5$, pentafluorophenol or pentachlorophenol.

The starting material used to prepare the fluorinated polymer according to the invention is a compound of formula I:

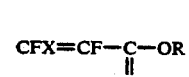
(I)

in which X is a hydrogen atom or a deuterium atom and R is a linear, branched or cyclic $C_1$–$C_{10}$ alkyl group or a $C_6$–$C_{10}$ aryl group, it being possible for all or some of the hydrogen atoms in R to be replaced with fluorine, chlorine or bromine atoms.

The aforementioned 2,3-difluoroacrylic acid esters can be prepared by esterification of 2,3-dichloro-2,3-difluoropropionic acid or a corresponding acid halide with an alcohol of the formula

R—OH in which R is as defined in formula I, followed by dehalogenation with zinc. The corresponding 3-deutero-2,3-difluoroacrylic acid esters are obtained by esterification of 3-deutero-2,3-difluoroacrylic acid or its acid halide with an alcohol of the above formula.

The molding compound according to the invention consists of 10 to 100, preferably 40 to 100 and most preferably 50 to 90% by weight of units derived from an ester of formula I, and of 90 to 0% by weight, preferably 60 to 0% and most preferably 50 to 10% of units derived from other copolymerizable vinyl compounds. Suitable vinyl compounds are $C_1$ to $C_8$ alkyl acrylates, methacrylates or 2-fluoroacrylates, styrene or substituted styrenes, or deuterated derivatives thereof. Methacrylic and 2-fluoroacrylic acid esters and styrene are preferred, especially fluorinated, chlorinated or deuterated derivatives thereof. Especially preferred vinyl compounds are methyl methacrylate, 1,4,5,6,7,7-hexachlorobicycloheptenyl methacrylate, methyl 2-fluoroacrylate, 1,4,5,6,7,7-hexachlorobicycloheptenyl 2-fluoroacrylate and hexafluoroisopropyl 2-fluoroacrylate, styrene, trifluorostyrene, pentafluorostyrene and the following deuterated derivatives thereof: methyl methacrylate-$d_8$, 1,4,5,6,7,7-hexachlorobicycloheptenyl methacrylate-$d_8$, methyl 2-fluoroacrylate-$d_5$, 1,4,5,6,7,7-hexachlorobicycloheptenyl 2-fluoroacrylate-$d_5$ and hexafluoroisopropyl 2-fluoroacrylate-$d_3$, styrene-$d_8$, trifluorostyrene-$d_5$ and pentafluorostyrene-$d_3$.

The molding compound according to the invention is prepared by free radical block polymerization or by solution, suspension or emulsion polymerization, especially by the block polymerization of a compound of formula I and, if appropriate, another copolymerizable vinyl compound.

Suitable free radical initiators are azo compounds such as azobisisobutyronitrile, azobis(cyclohexylcarbonitrile), azobis(t-octane) and 2-phenylazo-2,4-dimethyl-4-methoxyvaleronitrile, and organic peroxides such as t-butyl peroxide, t-butyl peroctanoate, t-butyl peroxyisopropylcarbonate, t-butyl hydroperoxide, t-butyl peroxyisobutyrate and dicumyl peroxide. The amount of initiator is in the range from 0.001 to 3.0, preferably 0.035 to 1.0 mol per 100 mol of the monomer or monomers. The polymerization can also take place in the presence of a chain transfer agent (regulator). Mercaptans such as n- or t-butylmercaptan, propylmercaptan, phenylmercaptan, t-hexylmercaptan and butylene-1,4-dithiol, and mercaptoacetic acid esters, for example methyl mercaptoacetate and ethylene glycol bis(mercaptoacetate), are particularly suitable for this purpose. The polymerization temperature is 20° to 180° C., preferably 40° to 160° C. and most preferably 60° to 140° C.

It is advisable to degas the mixture before polymerization. To do this, the reaction mixture consisting of monomers, one or more initiators and regulators is first cooled in a reactor to a temperature of at least −80° C., and the reactor is then evacuated and, after sealing, heated to a temperature of 0° to 25° C.; this process is preferably repeated several times. Alternatively, it is possible to pass a gaseous stream of hydrogen, helium, argon or nitrogen through the reaction mixture for a period of 1 to 60 min, preferably 5 to 30 min, the gas being led to the bottom of the reactor by means of an immersed gas distribution tube.

The molding compound according to the invention is produced in the form of a transparent mass which can be shaped thermoplastically. It is therefore particularly suitable as a material for the manufacture of transparent objects, e.g. resist materials, lenses or beam waveguides, and, either on its own or mixed with another polymer having a different coefficient of orientation birefringence, as a material for optical data stores. The spectral transparency of the molding compound is particularly high in the wavelength range between 400 and 900 ran, especially if all or most of the hydrogen atoms in the monomers used to prepare the molding compounds have been replaced with fluorine, chlorine or deuterium atoms.

According to the invention, said polymers can be used in particular to manufacture beam waveguides, including beam waveguides with a core-sheath structure. The beam waveguides can contain said polymers in both the core and the sheath. When selecting the core and sheath materials, care should be taken to ensure that the refractive indices of the core material and sheath material of a beam waveguide, $n_K$ and $n_M$ respectively, satisfy the equation $$n_K - n_M > 0.01$$

The core materials which are preferably used are polymers containing monomer units of formula I in which X is a hydrogen or deuterium atom and R is a linear, branched or cyclic $C_1$-$C_{10}$ alkyl group in which all or some of the hydrogen atoms have been replaced with fluorine, chlorine or deuterium atoms, and copolymers containing different monomer units of formula I in which X is a hydrogen or deuterium atom and R is different linear, branched or cyclic alkyl groups having 1 to 10 carbon atoms in which all or some of the hydrogen atoms have been replaced with fluorine, chlorine or deuterium atoms. Especially preferred polymers and copolymers are those containing units of formula I in which the acid component is 2,3-difluoroacrylic acid or 3-deutero-2,3-difluoroacrylic acid, in particular 3-deutero-2,3-difluoroacrylic acid, and the alcohol component is methanol or a fluorinated or chlorinated linear, branched or alicyclic alcohol having 2 to 10 carbon atoms, especially methanol or fluorinated and chlorinated branched or alicyclic alcohols having 3 to 10 carbon atoms, in particular methanol-$d_3$, 2-deuterohexafluoroisopropanol, perfluoro-2,3-dimethylbutan-2-ol, perfluoro- or perchloro-cyclopentanol or -cyclohexanol, and 1,4,5,6,7,7-hexachloro- and -hexabromobicycloheptenol-$d_3$, 5,5,6,6-tetrakis(trifluoromethyl)bicycloheptanol-$d_{11}$, 5,6-difluoro-5,6-bis(trifluoromethyl)-bicycloheptanold$_{11}$, 5,5,6,6-tetrafluorobicycloheptanol-d$_{11}$, 1,4,5,5(or 6,6),7,8-hexachloro-6(or 5-)oxobicyclooctenol-$d_3$ [sic] or (1,4,5,6,7,7-hexachlorobicycloheptenyl)methanol-$d_5$, or a $C_6$-$C_{10}$ aryl hydroxyl compound, preferably pentachloro- or pentafluorophenol.

The transmittance of these beam waveguides is markedly improved by comparison with the state of the art and with beam waveguides containing polymers derived from monomer units which still contain hydrogen atoms. The beam waveguides manufactured from these polymers can therefore also be used in the 850 nm wavelength region in which high-efficiency light emitting diodes and semiconductor lasers as well as receivers are available, thereby making it possible simultaneously to achieve long transmission distances for light signals both in the polymer beam waveguides according to the invention and in beam waveguides made of quartz glass. The sheath materials used are copolymers which contain monomer units derived from formula I and which have a lower refractive index on account of the fact that they have a higher content than the core material of monomer units of formula I in which R is an alkyl radical in which all or most of the hydrogen atoms have been replaced with fluorine atoms.

Other sheath materials which can be used are polymers containing monomer units derived from fluoroalkyl esters, especially the hexafluoroisopropyl ester or perfluoro-2,3-dimethylbut-2-yl ester, of 2-fluoroacrylic acid, or from the perfluoro-2,3-dimethylbut-2-yl ester of 2,3-difluoroacrylic acid, and copolymers containing monomer units derived from tetrafluoroethylene, from the [sic] perfluoroalkyl vinyl ethers and from ω-alkoxycarbonylperfluoro(alkyl vinyl ether)s [sic], especially from methyl perfluoro-3- oxapent-4-enylcarboxylate or methyl perfluoro-4-oxahex-5- enylcarboxylate.

Furthermore, it is possible to use 2,3-difluoroacrylic acid esters as sheath materials in beam waveguides whose core consist [sic] of polymers derived from monomer units not of formula (I), esters of methacrylic acid, acrylic acid and 2-fluoroacrylic acid, and styrene and substituted styrenes, or of polycarbonates. Polymers containing 2,3- difluoroacrylic acid esters as monomer units are preferably used as sheath materials when the core of the beam waveguide consists of polymers containing 2-fluoroacrylic acid esters as monomer units.

The following Examples are intended to illustrate the invention.

The viscosity number (in $cm^3/g$) was determined on solutions of one part by weight of the polymer in 100 parts by weight of ethyl acetate at 25° C.

The residual monomer content (given in parts by weight per 100 parts of the polymer) was determined by gas chromatography, with the aid of an internal standard, on solutions of 5 parts by weight of the polymer in 100 parts of a suitable solvent.

The refractive index was measured with the aid of an Abbe refractometer on films of the polymer cast from a suitable low-boiling solvent and dried until the measured value was constant.

The glass transition temperature was determined by means of differential scanning calorimetry (DSC) at a heating rate of 20° C./min.

The attenuation was determined on 30 m lengths of the beam waveguides by bunching light of a particular wavelength (650 nm, 830 nm) at one end of the beam waveguide and measuring the light intensity at the other end as a function of the length of the beam waveguide, which was shortened by a certain amount after each measurement. The attenuation is given as the gradient of a logarithmic plot of the light intensities versus the length of the beam waveguide in km.

To test the heat stability, one length of the beam waveguide was exposed to normal ambient air for two hours at each of the temperatures indicated and the attenuation was then measured.

To test the flexural strength ("flexural test"), a 20 to 30 m length of a beam waveguide was clamped in the device for measuring attenuation, the attenuation was determined and a 50 cm length of this beam waveguide was wound around a bar of 10 mm diameter. The beam waveguide was removed from the bar and straightened out. The transmitted light intensity was then measured again and the increase in attenuation as a result of deformation of the beam waveguide, converted to db/km, was added to the attenuation of the undamaged beam waveguide.

EXAMPLE 1

100 g of methyl 2,3-difluoroacrylate (formula I: X=H, R=methyl) were treated with 0.3 g of dicumyl peroxide, filtered through a membrane filter (pore width 45 nm) and introduced into a glass vessel which had been rinsed until free of particles. The mixture was degassed by having helium gas bubbled through it for a period of 20 min, the oxygen partial pressure above the mixture thereby being reduced to one thousandth of the saturation value. The mixture was cooled to −60° C. in a helium atmosphere and evacuated. The glass vessel was then hermetically sealed and the product was heated first at 80° C. for 90 h and then to 130° C. at a uniform slow rate over a period of 50 h. The reaction mixture was cooled to give a transparent polymer having the properties listed in Table 1.

EXAMPLE 2

A mixture of 50 g of hexafluoroisopropyl 2,3-difluoroacrylate (formula 1: X=H, R=hexafluoroisopropyl) and 50 g of methyl 2,3-difluoroacrylate (formula I: X=H, R=methyl) was treated with 0.3 g of t-butyl peroxyisopropylcarbonate, filtered through a membrane filter (pore width 45 nm) and introduced into a glass vessel which had been rinsed until free of particles. The mixture was degassed by having helium gas bubbled through it for a period of 20 min, the oxygen partial pressure above the mixture thereby being reduced to less than one thousandth of the saturation value. The mixture was cooled to −60° C. in a helium atmosphere and evacuated. The glass vessel was then hermetically sealed and the product was heated first at 65° C. for 90 h and then to 115° C. over a period of 50 h. The reaction mixture was cooled to give a transparent polymer. See Table 1 for properties.

EXAMPLE 3

100 g of cyclohexyl 2,3-difluoroacrylate (formula I: X=H, R=cyclohexyl) were treated with 0.3 g of dicumyl peroxide, filtered through a membrane filter (pore width 45 rim) and introduced into a glass vessel which had been rinsed until free of particles. The mixture was degassed by having helium gas bubbled through it for a period of 20 min, the oxygen partial pressure above the mixture thereby being reduced to less than one thousandth of the saturation value. The mixture was cooled to −60° C. in a helium atmosphere and evacuated. The glass vessel was then hermetically sealed and the product was heated first at 80° C. for 90 h and then to 130° C. at a uniform slow rate over a period of 50 h. The reaction mixture was cooled to give a transparent polymer having the properties listed in Table 1.

EXAMPLE 4

100 g of 1,4,5,6,7,7-hexachlorobicycloheptenyl 2,3-difluoroacrylate (formula I: X=H, R=1,4,5,6,7,7-hexachlorobicycloheptenyl) were treated with 0.3 g of di-t-butyl peroxide, filtered through a membrane filter (pore width 45 ran) and introduced into a glass vessel which had been rinsed until free of particles. The mixture was degassed by having helium gas bubbled through it for a period of 20 min, the oxygen partial pressure above the mixture thereby being reduced to less than one thousandth of the saturation value. The mixture was cooled to −60° C. in a helium atmosphere and evacuated. The glass vessel was then hermetically sealed and the product was heated first at 90° C. for 90 h and then to 140° C. at a uniform slow rate over a period of 50 h. The reaction mixture was cooled to give a transparent polymer. See Table 1 for properties.

EXAMPLE 5

100 g of methyl 2,3-difluoroacrylate-$d_4$ (formula I: X=D, R=deuteromethyl) were treated with 0.3 g of dicumyl peroxide, filtered through a membrane filter (pore width 45 nm) and introduced into a glass vessel which had been rinsed until free of particles. The mixture was degassed by having helium gas bubbled through it for a period of 20 min, the oxygen partial pressure above the mixture thereby being reduced to one thousandth of the saturation value. The mixture was cooled to −60° C. in a helium atmosphere and evacuated. The glass vessel was then hermetically sealed and the product was heated first at 80° C. for 90 h and then to 130° C. at a uniform slow rate over a period of 50 h. The reaction mixture was cooled to give a transparent polymer having the properties shown in Table 1.

EXAMPLE 6

10 kg of methyl ethyl ketone and 5 kg of hexafluoroisopropyl 2,3-difluoroacrylate were treated with 12.5 g of azobisisobutyronitrile (AIBN), nitrogen gas was bubbled through and the mixture was stirred for 48 h at 60° C. in a nitrogen atmosphere. The product was then precipitated in petroleum ether (boiling range 60° to 80° C.) and collected on a filter. The product (yield: 91%) was then dried to constant weight and had the properties indicated in Table 1.

of a beam waveguide. The polymer according to Example 6 was fed into a twin-screw extruder with vent zone and processed to form the sheath of the beam waveguide. The properties of the beam waveguide are described in Table 2.

EXAMPLES 8 AND 9

A polymer prepared according to Example 2 or 3 was melted in a ram extruder and extruded to form the core of a beam waveguide. A copolymer consisting of 60 parts by weight of tetrafluoroethylene, 34 parts by weight of perfluoropropyl vinyl ether and 6 parts by weight of methyl perfluoro-3-oxapent-4-enylcarboxylate (melt flow index: 13 g/10 min at 230° C., 3.8 kg load) was fed into a twin-screw extruder with vent zone and processed to form the sheath of the beam waveguide. The properties of the beam waveguide are described in Table 2.

EXAMPLE 10

A mixture contained [sic] of 50 g of hexafluoroisopropyl 2-fluoroacrylate and 50 g of methyl 2-fluoroacrylate was treated with 0.02 g of t-butyl peroxyisopropylcarbonate and 0.15 g of butylmercaptan, filtered through a membrane filter (pore width 45 nm) and introduced into a glass vessel which had been rinsed until free of particles. The mixture was degassed by having helium gas bubbled through it for a period of 20 min, the oxygen partial pressure above the mixture thereby being reduced to one thousandth of the saturation value. The mixture was cooled to −60° C. in a helium atmosphere and evacuated. The glass vessel was then hermetically sealed and the product was heated first at 75° C. for 15 h and then at 115° C. for a further 24 h. The reaction mixture was cooled to give a transparent polymer.

The polymer was melted in a ram extruder and extruded to form the core of a beam waveguide. A polymer prepared according to Example 6 was melted in a

TABLE 1

| Example | Structure of the monomer units X | R | Composition [parts by weight] | Viscosity number [cm$^3$/g] | Residual monomer content [%] | Refractive index | Glass transition temp. [°C.] |
|---|---|---|---|---|---|---|---|
| 1 | H | CH$_3$ | | 48 | 0.12 | 1.43 | 140 |
| 2 | H | CH(CF$_3$)$_2$ | 50 | 61 | 0.14 | | |
|   | H | CH$_3$ | 50 | | 0.02 | 1.38 | 120 |
| 3 | H | C$_6$H$_{11}$ | | 58 | 0.18 | 1.45 | 142 |
| 4 | H | C$_7$H$_3$Cl$_6$ | | 65 | 0.76 | 1.51 | 242 |
| 5 | D | CD$_3$ | | 51 | 0.09 | 1.43 | 139 |
| 6 | H | CH(CF$_3$)$_2$ | | 57 | 0.13 | 1.34 | 98 |

EXAMPLE 7

A polymer prepared according to Example 5 was melted in a ram extruder and extruded to form the core twin-screw extruder with vent zone and processed to form the sheath of the beam waveguide. The properties of the beam waveguide are described in Table 2.

TABLE 2

| Example | Structure of the monomer units in the core X | R | Composition | Attenuation at 650 nm [dB/km] | Attenuation at 830 nm [dB/km] | Attenuation after 2 h in heating cabinet [dB/km] | [°C.] | Attenuation at 650 nm after flexural test [dB/km] |
|---|---|---|---|---|---|---|---|---|
| 7 | D | CD$_3$ | | 75 | 80 | 80 | 95 | 82 |
| 8 | H | CH$_3$ | 50 | | | | | |
|   | H | CH(CF$_3$) [sic] | 250 | 140 | 350 | 153 | 80 | 160 |
| 9 | H | C$_5$H$_{11}$ | | 165 | — | 170 | 80 | — |

TABLE 2-continued

| Example | Structure of the monomer units in the core X | R | Composition | Attenuation at 650 nm [dB/km] | Attenuation at 830 nm [dB/km] | Attenuation after 2 h in heating cabinet [dB/km] | [°C.] | Attenuation at 650 nm after flexural test [dB/km] |
|---|---|---|---|---|---|---|---|---|
| 10 | *) | | 70 | 310 | 320 | 110 | 350 | |

*) copolymer consisting of 50 parts by weight of hexafluoroiso-propyl 2-fluoroacrylate and 50 parts by weight of methyl 2-fluoroacrylate

What is claimed is:

1. A transparent thermoplastic molding compound consisting of 10 to 100% by weight of units derived from one or more esters of formula I:

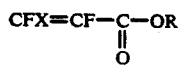

wherein
X is a hydrogen atom or a deuterium atom and
R is a linear, branched or cyclic $C_1$–$C_{10}$ alkyl group or a $C_6$–$C_{10}$ aryl group, it being possible for all or some of the hydrogen atoms in R to be replaced with fluorine, chlorine, bromine or deuterium atoms, and 90 to 0% by weight of units derived from other copolymerizable vinyl compounds.

2. A molding compound as claimed in claim 1 containing units of formula I in which X is a deuterium atom and R is a methyl group, a fluorinated or chlorinated branched or cyclic $C_3$–$C_{10}$ alkyl group or a $C_6$–$C_{10}$ aryl group, it being possible for further hydrogen atoms in R to be replaced with deuterium atoms.

* * * * *